United States Patent
Bates et al.

(10) Patent No.: US 6,781,571 B2
(45) Date of Patent: Aug. 24, 2004

(54) METHOD AND SYSTEM FOR SELECTIVELY CONTROLLING GRAPHICAL POINTER MOVEMENT BASED UPON WEB PAGE CONTENT

(75) Inventors: Cary Lee Bates, Rochester, MN (US); Steven Paul Jones, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 09/970,602

(22) Filed: Oct. 4, 2001

(65) Prior Publication Data

US 2003/0067442 A1 Apr. 10, 2003

(51) Int. Cl.[7] .................................................. G09G 5/08
(52) U.S. Cl. ........................ 345/159; 345/856; 345/858
(58) Field of Search ......................... 345/159, 856–862, 345/781, 784, 785, 788, 798, 799, 800

(56) References Cited

U.S. PATENT DOCUMENTS

| | | |
|---|---|---|
| 4,841,454 A | 6/1989 | Awazu |
| 5,256,067 A | 10/1993 | Gildea et al. |
| 5,434,591 A | 7/1995 | Goto et al. |
| 5,495,566 A | 2/1996 | Kwatinetz |
| 5,530,455 A | 6/1996 | Gillick et al. |
| 5,592,195 A | 1/1997 | Misono et al. |
| 5,786,805 A * | 7/1998 | Barry .......................... 345/159 |
| 5,874,957 A | 2/1999 | Cline et al. |
| 5,874,961 A | 2/1999 | Bates et al. |
| 6,043,809 A | 3/2000 | Holehan |
| 6,131,110 A | 10/2000 | Bates et al. |
| 6,185,588 B1 | 2/2001 | Olson-Williams et al. |
| 6,192,398 B1 | 2/2001 | Hunt |
| 6,559,873 B1 * | 5/2003 | Dawkins et al. ............. 345/862 |
| 2001/0045936 A1 * | 11/2001 | Razzaghi ..................... 345/156 |

* cited by examiner

*Primary Examiner*—Dennis-Doon Chow
(74) *Attorney, Agent, or Firm*—Dillon & Yudell, LLP (57) ABSTRACT

A method and system for selectively controlling mouse movement speed during movement within a particular web page or display window based upon a user's prior experience within that web page or various physical parameters associated with the size and content of the web page. A user's previous experience of the relative size, number and location of selectable icons or selectable graphical areas within the display are determined and utilized to automatically alter the speed of mouse pointer movement. Prior experience with web pages having similar content can also be utilized to automatically set the speed of the mouse pointer.

13 Claims, 5 Drawing Sheets

METHOD AND SYSTEM FOR SELECTIVELY CONTROLLING GRAPHICAL POINTER MOVEMENT BASED UPON WEB PAGE CONTENT

CROSS REFERENCE TO RELATED APPLICATIONS

The present Application is related to the content of U.S. patent application Ser. No. 09/392,759, filed Sep. 7, 1999, which is assigned to the Assignee of the present application, the content of which is hereby incorporated herein by reference thereto.

BACKGROUND OF THE INVENTION

1. Technical Field

The present invention relates in general to improved graphical user interfaces (GUIs) and in particular to a method and system for automatically altering the speed of movement of a mouse pointer or other graphical pointer in response to a display of a particular web page or display window. Still more particularly, the present invention relates to a method and system for analyzing the content of a particular web page or the user's prior experience with a particular web page or display window to automatically determine an optimum movement speed for a graphical pointer.

2. Description of the Related Art

The development of computerized distributed information resources, such as the "Internet," allows users to link with servers and networks, and thus retrieve vast amounts of electronic information heretofore unavailable in an electronic medium. Such electronic information is increasingly displacing more conventional means of information transmission, such as newspapers, magazines, and even television. The term "Internet" is an abbreviation for "Internetwork" and refers commonly to a collection of computer networks which utilize the TCP/IP suite of protocols, well-known in the art of computer networking. TCP/IP is an acronym for "Transport Control Protocol/Interface Program," a software protocol developed by the Department of Defense for facilitating communication between computers.

Electronic information transferred between computer networks (e.g. the Internet) can be presented to a user in hypertext, a metaphor for presenting information in a manner in which text, images, sounds, and actions become linked together in a complex non-sequential web of associations that permit a user to "browse" through related topics, regardless of the presented order of the topics. These links are often established by both the author of the hypertext document and by the user, depending on the intent of the hypertext document. For example, traveling among links to the word "iron" in an article displayed within a graphical user interface in a computer system might lead the user to a periodic table of the chemical elements (i.e. linked by the word "iron"), or to a reference to the use of iron in weapons in Europe in the Dark Ages. The term "hypertext" is utilized to describe documents, as presented by a computer, that express a non-linear's structure of ideas, as opposed to linear format of books, film and speech.

Hypertext, especially in an interactive format where choices are controlled by the user, is structured around the idea of offering a working and learning environment that parallels human thinking, that is, an environment that allows the user to make associations between topics rather than moving sequentially from one topic to the next, as in an alphabetic list. Hypertext topics are linked in a manner that allows users to jump from one subject to another related subject during a search for information by selection of the hypertext link utilizing a graphical pointer, such as a mouse pointer.

A "web page" (also referred to by some designers simply as a "page") is a data file written in a hypertext language that may have text, graphic images, and even multimedia objects such as sound recordings or moving video clips associated with that data file. The web page can be displayed as a viewable object within a window in a computer system. A viewable object can contain one or more components such as spreadsheets, text, hot links, pictures, sound and video objects. A web page is typically constructed by loading one or more separate files into an active directly or file structure that is displayed as a viewable object within a graphical user interface.

As various "web sites" are visited via hypertext links displayed within a web browser, URLs (Universal Resource Locators) representative of the web sites visited during a given web navigation system or typically recorded by the web browser. Because web sites tend to proliferate over time, a user searching for a particular or important web site can find it difficult to find those particular or important web sites. Additionally, the selection utilizing a graphical or mouse pointer of various hyperlinks within a web site may result in navigation through existing web sites to a web site not previously visited. Consequently, it must be appreciated that rapid and accurate manipulation of a graphical pointer, such as a mouse pointer, is an important feature of modern internet navigation.

Most modern computer systems utilize a graphical pointer, such as a mouse, which permits the user to vary the speed of movement of a graphical pointer to meet their particular needs. Thus, most experienced users prefer a graphical pointer which moves at a relatively rapid speed, while the young and elderly often select a slower graphical pointer speed in order to accurately be able to position the mouse pointer over small targets which exist in today's window interfaces. Additionally, elderly users frequently have poor vision and consequently sites designed for the elderly tend to use larger than average fonts and larger icons. However, despite the combination of larger screens, font sizes and web pages, many elderly users are not as dexterous as they were when younger and controllable graphical pointer speeds are therefore an important function for usability within the internet system.

However, as noted above, the complexity and display parameters for internet display screens can vary dramatically and a single selected speed of operation for a mouse or graphical pointer can decrease the usability of a graphical user interface.

SUMMARY OF THE INVENTION

It is therefore an object of the present invention to provide an improved graphical user interface.

It is another object of the present invention to provide a method and system for automatically altering the speed of movement of a mouse pointer or other graphical pointer in response to a display of a particular web page or display window.

It is yet another object of the present invention to provide a method and system for analyzing the content of a particular web page or the prior experience of a user with a particular web page or display window to automatically determine an optimal movement speed for a graphical pointer within that web page or display window.

The foregoing objects are achieved as is now described. A method and system are provided for selectively controlling mouse movement speed during movement within a particular web page or display window based upon a user's prior experience with that web page or various physical parameters associated with the size and content of the web page. A user's previous experience or the relative size, number and location of selectable icons or links within the display are determined and utilized to automatically alter the speed of mouse pointer movement. Prior experience with web pages having similar content can also be utilized to automatically adjust the speed of the mouse pointer.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
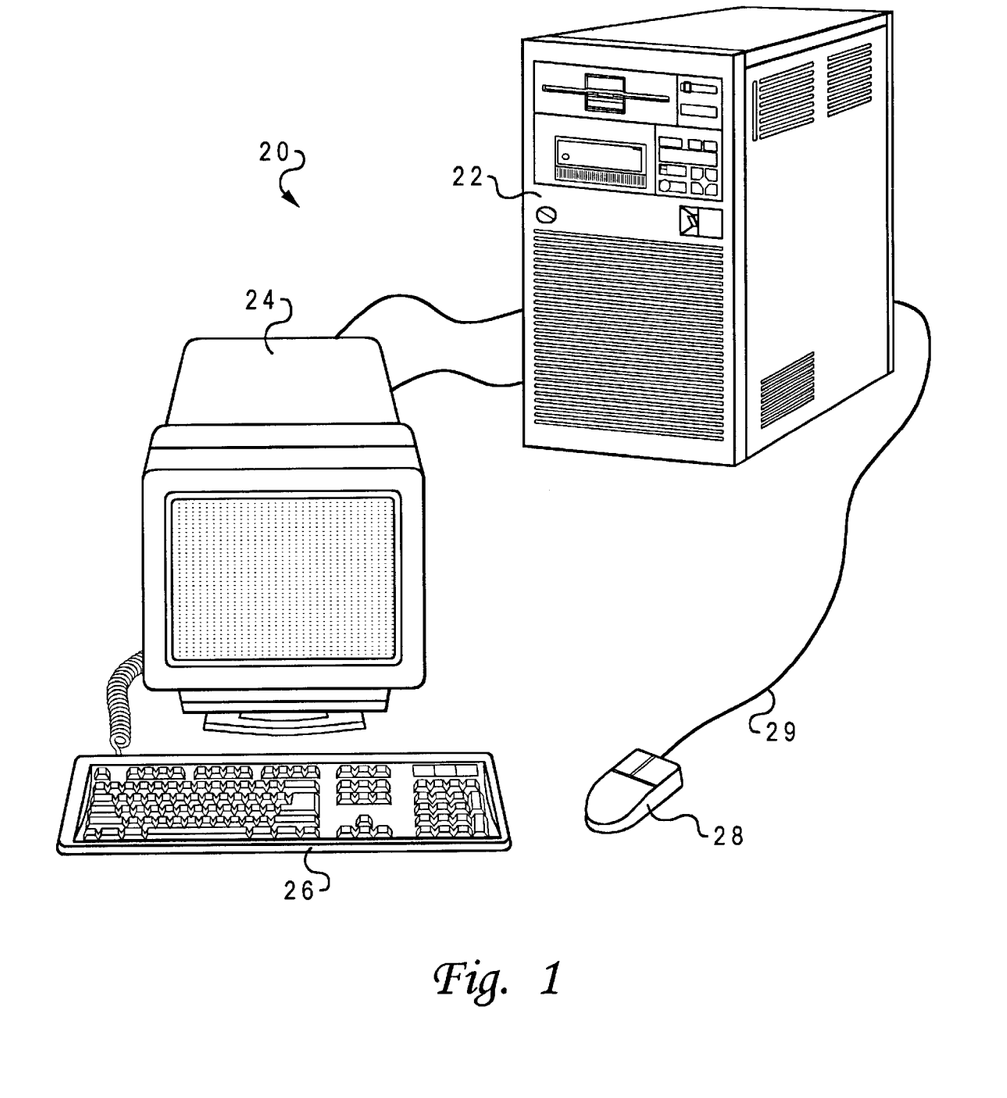
FIG. 1 illustrates a pictorial representation of a computer system which may be utilized to implement a preferred embodiment of the present invention.

With reference now to the figures and in particular with reference to FIG. 1, there is depicted a pictorial representation of a computer system in accordance with a preferred embodiment of the present invention. A computer system 20 is depicted which includes a system unit 22, a video display terminal 24, a keyboard 26, and a mouse 28. System unit 22 typically includes disk and tape drive. Video display terminal 24 is the visual output of computer system 20. Video display terminal 24 can be a Cathode-Ray Tube (CRT) based video display well-known in the art of computer hardware.

Keyboard 26 is that part of computer system 20 which resembles a typewriter keyboard and which enables a user to control particular aspects of the computer. Because information flows in one direction, from keyboard 26 to system unit 22, keyboard 26 functions as an input only device. Functionally, keyboard 26 represents half of a complete input/output device, the output half being video display terminal 24. Keyboard 26 includes a standard set of printable characters presented in a QWERTY pattern typical of most typewriters.

In addition, keyboard 26 includes a calculator-like numeric keypad at one side. Some of these keys, such as the "control," "alt," and "shift" keys can be utilized to change the meaning of another key. Other special keys in combination of keys can be utilized to control program operations or to move either text or cursor on the display screen of video display terminal 24.

Mouse 28 is a pointing device which features a casing having a flat bottom that can be gripped by a human hand. Mouse 28 can include buttons on the top of the mouse, a multi-directional detection device, such as a ball, on the bottom of the mouse and a cable 29 which connects mouse 28 to computer system 20. As those having ordinary skill in the art will appreciate, additional graphic pointing devices such as track balls, light pens or like may be utilized.

Figure 2:
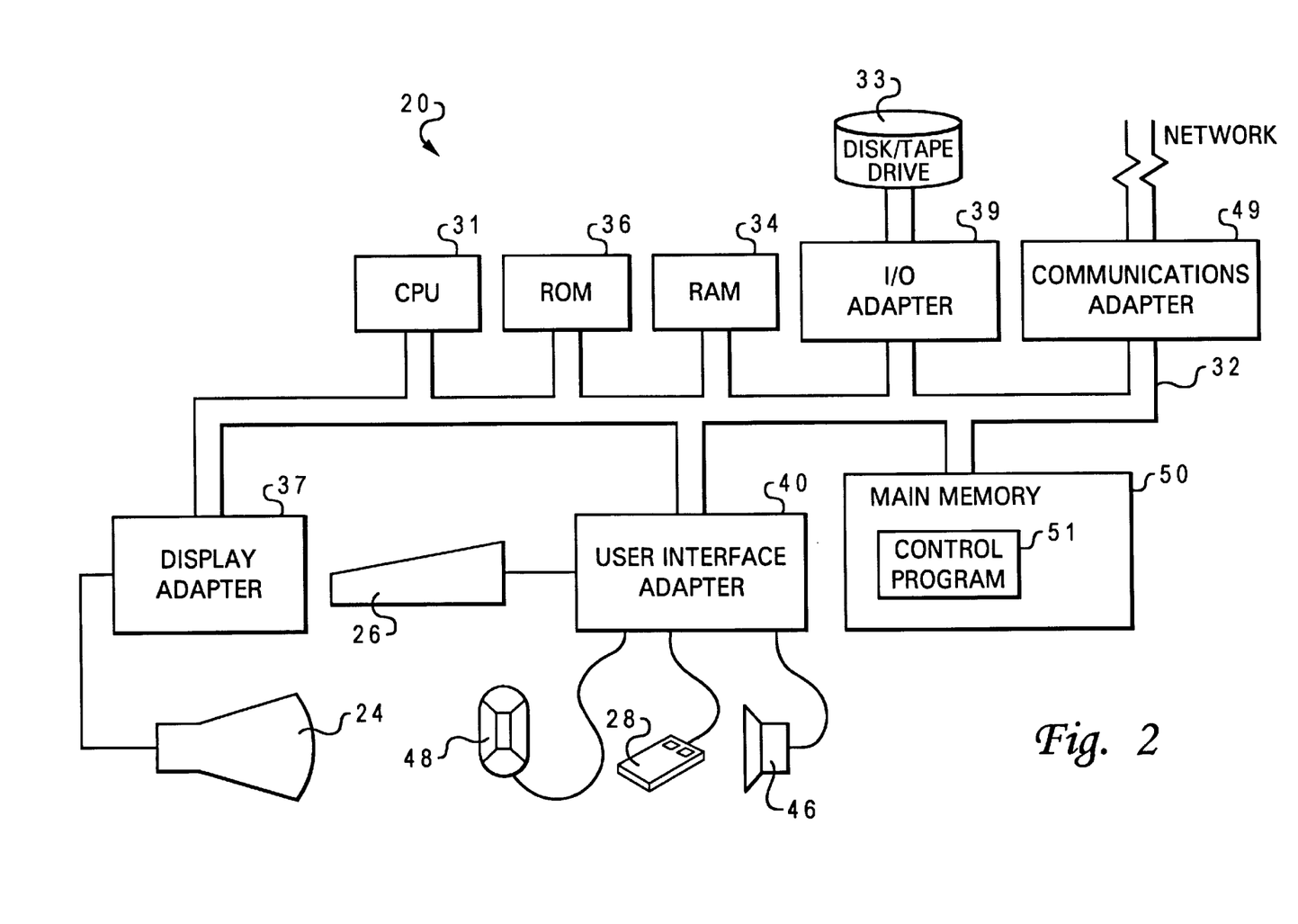
FIG. 2 depicts a representative hardware environment of the computer system illustrated in FIG. 1.

Computer system 20 can be implemented utilizing any suitable computer such as the iSeries Server computer system manufactured by International Business Machines Corporation, located in Armonk, N.Y. However, those skilled in the art will appreciate that a preferred embodiment of the present invention can apply to any computer system, regardless of whether the computer system is a complicated multi-user computing apparatus or a single-user work station. In FIG. 1 and FIG. 2 of the present description like parts are identified by like numbers. Computer system 20 is thus a configuration which includes all functional components of a computer and its associated hardware. In general, a typical computer system includes a console or system such as system unit 22, with one or more disk drives, a monitor such as video display terminal 24, and a keyboard such as keyboard 26. Additional hardware, often referred to in the art as peripheral devices can include such devices as printers and modems.

FIG. 2 depicts a representative hardware environment of the computer system illustrated in FIG. 1. Computer system 20 includes a Central Processing Unit (CPU) 31, such as a conventional microprocessor, and a number of other units interconnected via system bus 32. CPU 31 includes a portion of computer system 20 that controls the operation of the entire computer system, including executing the arithmetic and logic functions contained in a particular computer program. Although not depicted in FIG. 2, CPUs, such as CPU 31 typically include a control unit that organizes data and program storage in a computer memory and transfers the data and other information between various parts of the computer system. Such CPUs also generally include an arithmetic unit that executes the arithmetic and logical operations, such as addition, comparison, multiplications and so forth. Such components and units of computer system 20 can be implemented in a system unit such as system unit 22 of FIG. 1.

Computer system 20 preferably also includes random-access memory (RAM) 34, read-only memory (ROM) 36, display adapter 37 for connecting system bus 32 to video display terminal 24, and I/O adapter 39 for connecting peripheral devices (e.g., disk and tape drives 33) to system bus 32. RAM 34 is a type of memory design such that the location of data stored within that memory is independent of the content. Also, any location in RAM 34 can be accessed directly without having to work through that information from the beginning. ROM 36 is a type of memory that retains information permanently and in which stored information cannot be altered by a program or normal operation of a computer.

Video display terminal 24 is the visual output of computer system 20. As indicated herein, video display terminal 24 can be a Cathode-Ray Tube (CRT) based video display well-known in the art of computer hardware. However, with a portable or notebook-based computer, video display terminal 24 can be replaced with a liquid crystal display (LCD) based or gas plasma based flat-panel display. Those skilled in the art will appreciate that the configuration depicted in FIG. 1 is but one possible implementation of the components depicted in FIG. 2.

Portable and "laptop" based computers are other possible configurations. Computer system 20 further includes user interface adapter 40 for connecting keyboard 26, mouse 28, speaker 46, microphone 48, and/or other user interface devices, such as a touch-screen device (not shown) to system bus 32. User interface adapter 40 also preferably controls the speed and acceleration of the movement of a graphical pointer which is controlled by a graphical pointing device such as mouse 28.

Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Disk and tape drives 33 are electromechanical devices that read from and write to disk. The main components a disk drive in particular can include are a spindle on which a disk is mounted, a drive motor that spins the disk when the drive is in operation, one or more read/write heads which perform the actual reading and writing, a second motor that positions the read/write heads over the disk, and a controller circuitry which synchronizes read/write activities and transfers information to and from computer system 20.

A disk itself is typically a round, flat piece of flexible plastic (e.g. floppy disk) or inflexible metal (e.g. hard disk) coated with a magnetic material that can be electronically influenced to hold information recorded in a digital form. A disk is, in most computers, the primary method of storing data on a permanent or semi-permanent basis. Because the magnetic coating of the disk must be protected from damage and contamination, a floppy disk micro-floppy disk is typically encased in a protective plastic jacket. A hard disk, which is finely machined, is typically enclosed in a rigid case and can be exposed only in a dust free environment.

Computer system 20 also includes an interface that resides within a machine-readable media to direct operations of computer system 20. Any suitable machine-readable media may contain the interface, such as RAM 34, ROM 36, a magnetic diskette, magnetic tape, or optical disk (the last three being located in disk and tape 25 drives 33). Any suitable operating system and associated interface may direct CPU 31. For example, the AIX operating system and AIX windows windowing system can direct CPU 31. The AIX operating system is IBM's implementation of the UNIX operating system. UNIX is a trademark of UNIX Systems Laboratories, Inc. Other technologies can also be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet and web browser programs are built.

Those skilled in the art will appreciate that the hardware depicted in FIG. 2 may vary for specific applications. For example, other peripheral devices such as an optical disk media, audio adapters, or chip program devices, such as PAL or EPROM programming devices well-known in the art of computer hardware and the like, may be utilized in addition to or in place of the hardware already depicted. In addition, main memory 50 is connected to system bus 32 and includes a control program 51. Control program 51 resides within main memory 50 and contains instructions that, when executed on CPU 31, carry out the operations depicted in the logic flow chart of FIG. 5 as described herein. The computer program product can also be referred to as a program product. Control program 51 contains instructions that when executed on CPU 31 can carry out logical operations such as those operations described in the logic flow chart of FIG. 5.

It is important to note that, while the present invention has been (and will continue to be) described in the context of a fully functional computer system, those skilled in the art will appreciate that the present invention is capable of being distributed as a program product in a variety of phones, and that the present invention applies equally regardless of the particular type of signal-bearing media utilized to actually carry out the distribution. Examples of signal-bearing media include: recordable-type media, such as floppy disk, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
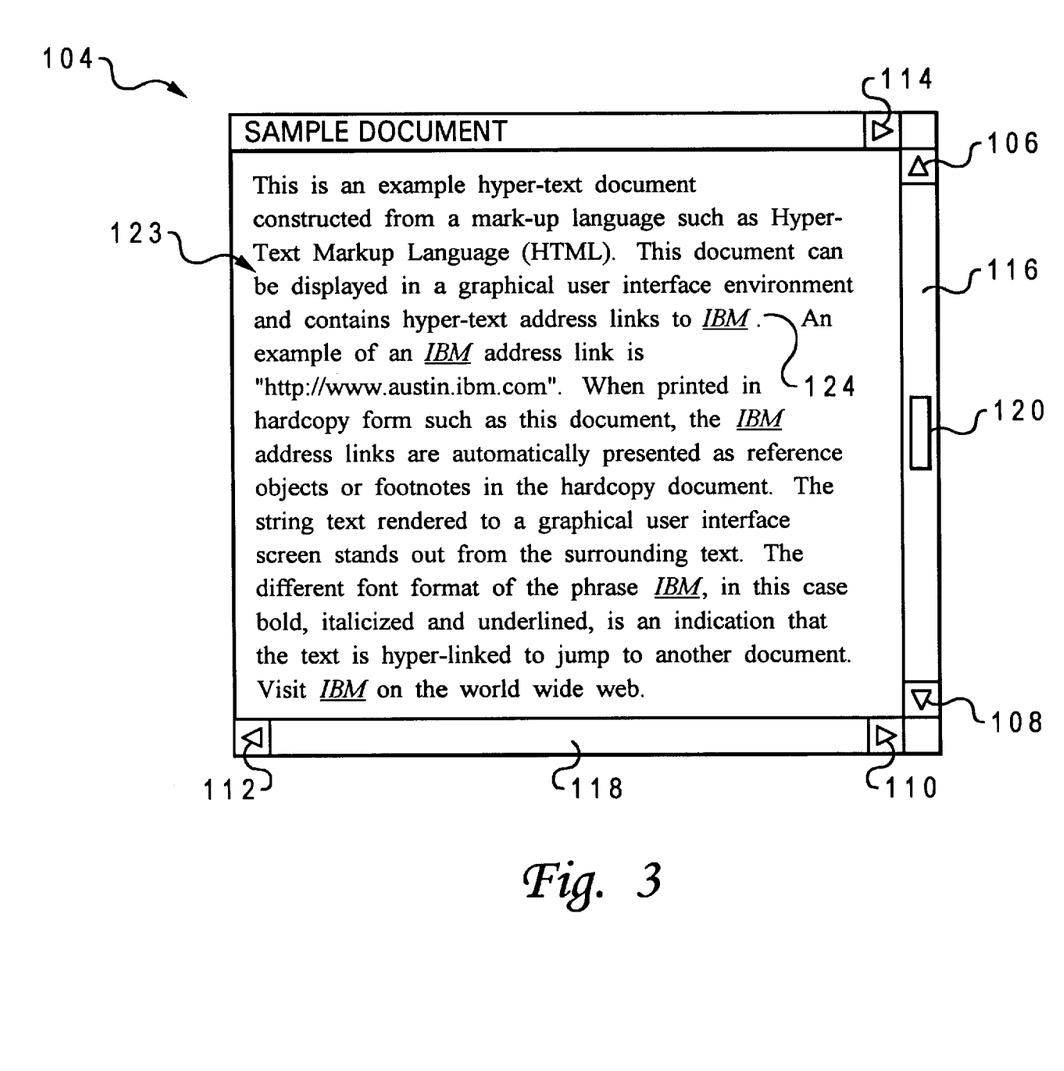
FIG. 3 illustrates an example hypertext document contained within a graphical user interface window which may be navigated and manipulated in accordance with the method and system of the present invention.

With reference now to FIG. 3, there is illustrated an example hypertext document 123 which may be contained within a graphical user interface window 104, which can be utilized in accordance with a preferred embodiment of the present invention. Note that a graphical user interface is a type of display format that enables the user to choose commands, start programs, and see lists of files and other options by pointing to pictorial representations (i.e., icons) and lists the menu items on a screen (i.e., monitor screen). Choices can generally be activated with a keyboard or a mouse. Window 104 which may be provided by a internet browser program or any other suitable application within computer system 20, displays a portion of a viewable object (i.e., hypertext document 123) constructed from a mark-up language. One such mark-up language that can be utilized in accordance with the example presented in FIG. 3 is the Hypertext Mark-Up Language (HTML). The size and position of elevator 120 within scroll bar 116 corresponds to the size and position of the current viewable page in relation to hypertext document 123. Hypertext document 123 can be accessed from a computer system contained within a computer or within a computer network such as the internet.

In example depicted in FIG. 3, because hypertext document 123 includes too many pages to view simultaneously, the user can position a mouse cursor over up-arrow section 106 or arrow section 108 of scroll bar 116 and click a pointing device (e.g., a mouse) to scroll the hypertext document 123 upward or downward, as appropriate. The horizontal scroll bar 118 includes arrow section 112 and arrow section 110 for scrolling hypertext document 123 respectively in a left or right direction. Also, an optional arrow section 114 allows a user to scroll the document in the right direction. Those skilled in the art will, of course, appreciate that such directional conventions are well known in the art and are not necessary features of the present invention.

Rather, such features represent specific types of graphical user interface components that can be utilized and selected by a graphical pointer which may be controlled in accordance with the preferred embodiment of the present invention. The graphical user interface contains window 104 and hypertext document 123 as a type of computer display format that enables the user to choose commands, start programs, and see lists of files or other options by pointing to a pictorial representation (i.e., icons) and lists of menu items on the screen utilizing a graphical pointing device such as a mouse.

As depicted, hypertext document 123 contains specific string text 124 rendered on the screen by the graphical user interface to stand out from the surrounding text. String text 124 is rendered in a different format. In example of FIG. 3, string text 124 is rendered as "IBM." The different font format of text string 124 is an indication that the text is hyperlinked to "jump" to another hypertext document. Thus, when a user clicks on string text 124 with a mouse or other pointing device, the graphical user interface shifts the presently viewed hypertext document 123 to another hyperlinked document (i.e. to another web page or web site).

Note that the term "hypertext document" as utilized herein simply refers to a web page or window which may include hypertext links to another web page or window. Highlighting of displayed hypertext links can also indicate that the high-lighted text is hyper-linked to "jump" to another hypertext document. Highlighting them is one method of altering the appearance of displayed characters or text in order to call attention to them. For example, greater attention can be focused on particular characters or text by displaying such characters or text with a higher intensity then surrounding characters or text, or by utilizing reverse video. As depicted in FIG. 3, the hypertext document illustrated therein includes a relatively few number of selectable links or control icons which can be selected utilizing a mouse pointer.

Figure 4:
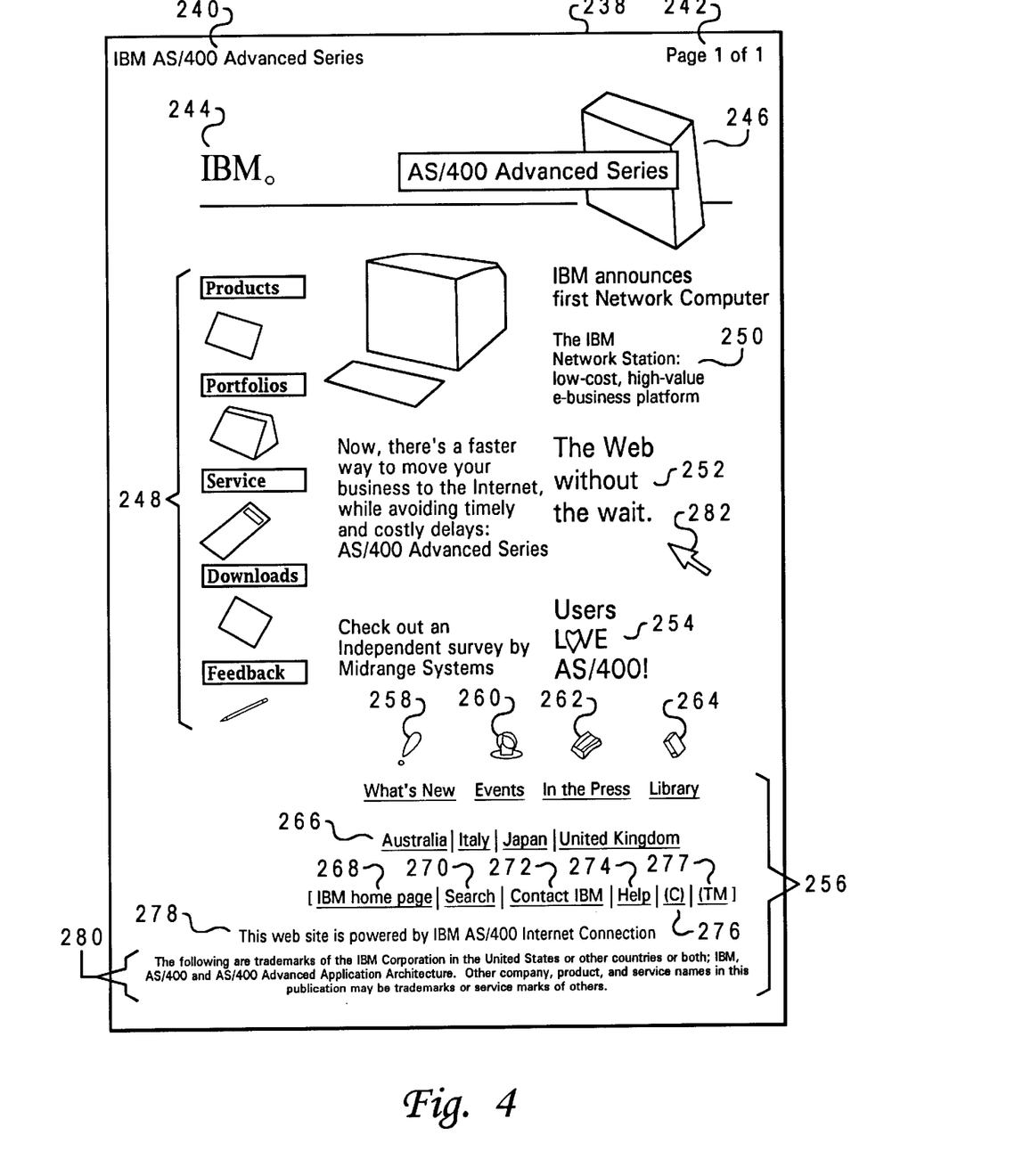
FIG. 4 is a pictorial representation of an alternate exemplary worldwide web page which may be navigated and manipulated in accordance with the method and system of the present invention.

Referring now to FIG. 4, there is depicted a pictorial representation of an exemplary internet page 238 which includes a much larger number of selectable icons and links. As is depicted, a page title 240 is provided in the upper left hand portion of internet page 238. Pagination information 242 is provided in the upper right hand portion of internet page 238. A graphical component 244 is provided which identifies the company associated with the internet page 238. A text and graphical component 246 is provided which identifies the content of internet page 238.

A plurality of subordinate graphical and text components 248 are also provided in internet page 238. Some relatively standard text 250 is provided within internet page 238, as well as text 254 which includes some graphical components (such as the heart shape in the word "Love"). At the bottom of internet page 238, a variety of textual and graphical components are provided which constitute a visually perceptible internet link from internet page 238 to other related internet pages.

A variety of icons 258, 260, 262 and 264 are provided. A variety of text links 266, 268, 270, 272, 274, 276 and 277 are also provided. Internet specific textual information 278 is provided within internet page 238.

Standard legal disclaimers 280 may also be provided in internet page 238. The items at the lower portion of internet page 238 constitute internet page specific information 256 which need not be present on internet page 238 when it is in the form of printed material. In fact, such textual and icono-graphic components may be confusing and serve no purpose in a printed text material. As illustrated, a mouse pointer or other graphical pointer 282 is provided which can be manipulated by a user of computer system 20 and utilized to select when one of the many icons or hyperlinks in internet page 238. As illustrated, internet page 238 is much more complicated than hypertext document 123 and thus requires a substantially different level of dexterity in manipulating graphical pointer 282.

Figure 5:
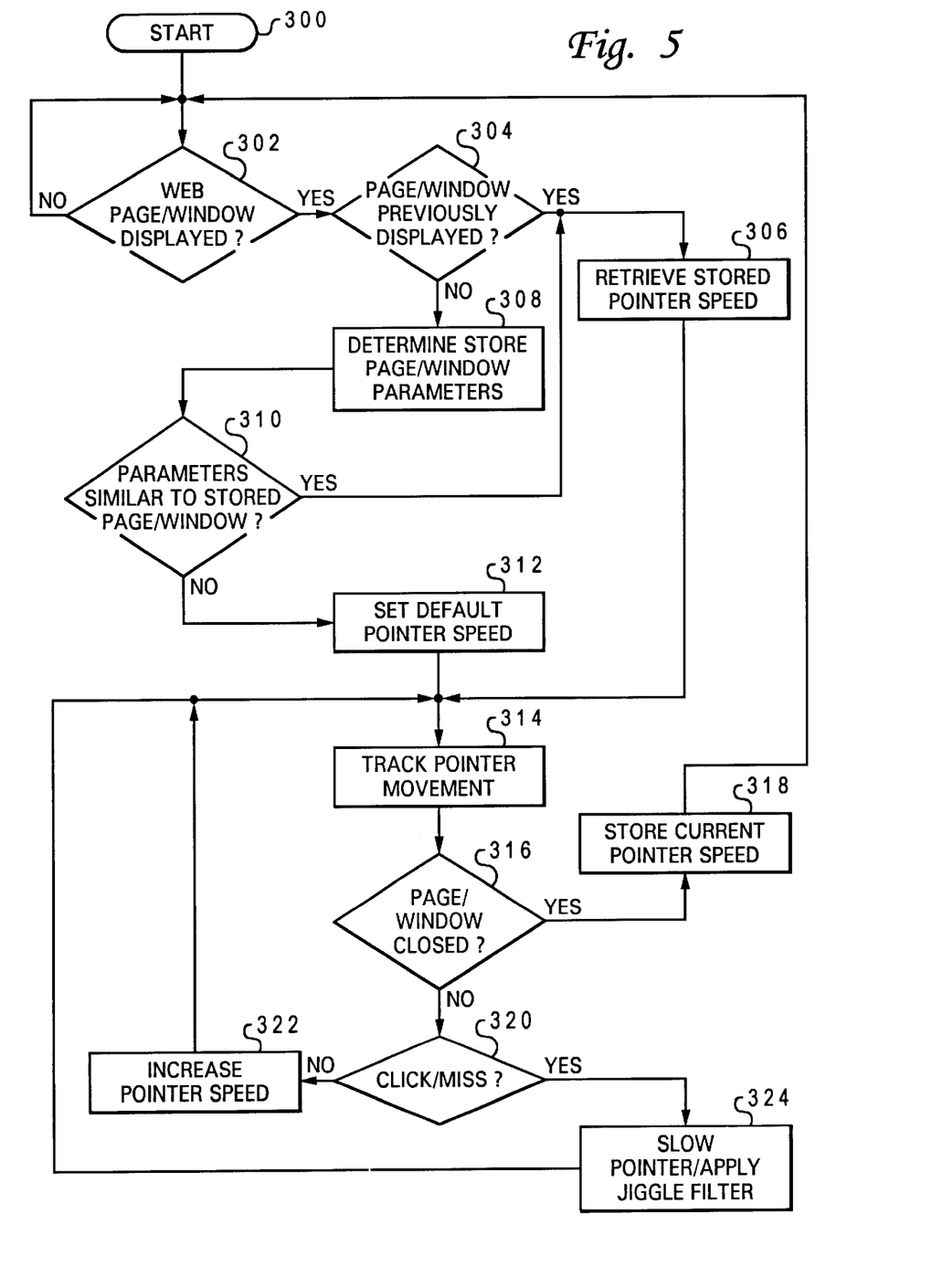
FIG. 5 is a high level logic flow chart which illustrates the process for implementing the method and system of the present invention.

Finally, with reference to FIG. 5 there is depicted a high level logic flow chart which illustrates a process for implementing the method and system of the present invention. As depicted, this process begins at block 300 and thereafter passes to block 302. Block 302 illustrates a determination of whether a web page or window is displayed within computer system 20 and if not, the process merely returns to block 302 in an iterative fashion.

Still referring to block 302, in the event a web page or window has been displayed block 304 illustrates a determination of whether or not the particular page or window has been previously displayed. If so, the process passes to block 306 where a stored setting for graphical pointer speed is retrieved.

Referring again to block 304, in the event the web page or window has not been previously displayed the process passes to block 308. Block 308 illustrates a determination and storage of the web page or window parameters. Those having ordinary skill in the art will appreciate that this can be accomplished by examining the page or window and dividing that page into subregions which are then examined for the number and distribution of icons, links or other selectable areas within these subregions. The number and size of selectable icons or regions within the current web page or window can be simply determined in this manner in a mathematical fashion.

Next, the process passes to block 310. Block 310 illustrates a determination of whether the distribution, size and number of icons or selectable areas within the current web page or window are similar to the parameters for a stored web page or window and if so, the process passes to block 306 which once again illustrates the retrieval of a stored pointer speed which has previously been determined to be optimal for web pages or windows of that style and complexity.

Still referring to block 310, in the event the parameters of the current web page or window are not similar to a stored web page or window, the process passes to block 312 which depicts the setting of a default pointer speed. Next, the process passes to block 314. Block 314 illustrates the tracking of pointer movement within the web page or window. Thereafter, as depicted at block 316, a determination is made as to whether the user has closed the web page or window and if so, the process passes to block 318 which depicts the storing of the currently set pointer speed and then the process returns to block 302, in an iterative fashion, to await a subsequent display of a web page or window.

Referring again to block 316, if the web page or window has not been closed the process passes to block 320. Block 320 illustrates a determination, based upon the tracking of pointer movement, as to whether the user has attempted to select an icon or particular selectable area and has clicked the mouse button or otherwise indicated a selection in the vicinity of the icon or selectable area without actually selecting that icon or selectable area. Such indication would be an indication that the speed of the graphical pointer is excessive and the user is having difficulty accurately controlling the location of the graphical pointer. Similarly, if movement of the graphical pointer tends to move in and out of a graphically selectable area, this indication could also be utilized to indicate difficulty on the part of the user in selecting the particular icon or selectable area.

However, in the event neither of these conditions is present the process passes to block 322 which illustrates an incremental increase in pointer speed and the process then returns to block 314, in an iterative fashion, to continue to track pointer movement until such time as the displayed web page or window has been closed.

As illustrated in block 320, if a user has repeatedly moved the graphical pointer into and out of a graphically selectable area or on to and off of a selectable icon and has unsuccessfully attempted to select that area or icon, the process passes to block 324. Block 324 illustrates the incremental slowing of the graphical pointer speed and the possible application of a so-called "jiggle" filter. By "jiggle" filter what is meant is if movement of the graphical pointer is observed to rhythmically shake or "jiggle" the control sequence can be altered to ignore any motion which does not exceed a predetermined threshold. Thus, by slowing the movement of the graphical pointer and/or applying a jiggle filter, the user interface may be enhanced by permitting an elderly or handicapped user to more easily select a particular icon or graphically selectable area within the displayed web page or window.

Thereafter, the process returns to block 314 to continue to track pointer movement and adaptively increase or decrease pointer speed until an optimal pointer speed is obtained or the web page or display window is closed.

Upon reference to the foregoing, those skilled in the art will appreciate that the method and system of the present invention provides a technique whereby the complexity of a particular window may be determined and the movement speed of a graphical pointer may be adjusted based either upon current experience with a particular web page or window or previous experience with that web page or window or a similarly displayed web page or window in order to enhance the ability of a user to graphically select objects within that window.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for selectively controlling the speed of movement of a graphical pointer in a computer system capable of displaying a plurality of pages of data which each include one or more graphically selectable areas depicted therein, said method comprising the steps of:
   determining a particular optimum speed of movement of a graphical pointer within a selected page of data by analyzing a display size and content of said selected page of data;
   detecting a display of said selected page of data within said computer system; and
   automatically setting said particular optimum speed of movement of said graphical pointer in response to detecting said display of said selected page of data.

2. The method for selectively controlling the speed of movement of a graphical pointer in a computer system according to claim 1 wherein each of said plurality of pages of data comprises a web page within the Internet and wherein the step of detecting a display of said selected page of data within said computer system comprises the step of identifying a Uniform Resource Locator (URL) associated with said selected page of data.

3. The method for selectively controlling the speed of movement of a graphical pointer in a computer system according to claim 1 wherein said step of analyzing the display size and content of said selected page of data comprises the step of analyzing the relative size of said selected page of data and a distance between graphically selectable areas within said selected page of data.

4. A system for selectively controlling the speed of movement of a graphical pointer in a computer system capable of displaying a plurality of pages of data which each include one or more graphically selectable areas depicted therein, said system comprising:
   a controllable graphical pointer driver for determining a particular optimum speed of movement of a graphical pointer within a selected page of data by determining a display size and content of said selected page of data;
   display control means for detecting a display of said selected page of data within said computer system; and
   control means coupled to said controllable graphical pointer driver for automatically setting said particular optimum speed of movement of said graphical pointer in response to detecting said display of said selected page of data.

5. A system for selectively controlling the speed of movement of a graphical pointer in a computer system according to claim 4 wherein each of said plurality of pages of data comprises a web page within the Internet and wherein said display control means further comprises means for identifying a Uniform Resource Locator (URL) associated with said selected page of data.

6. The system for selectively controlling the speed of movement of a graphical pointer in a computer system according to claim 4 wherein the means for determining a display size and content of said selected page of data comprises a means for analyzing a relative size of said selected page of data and a distance between selectable graphical areas within said selected page of data.

7. A computer program product for selectively controlling the speed of movement of a graphical pointer in a computer system capable of displaying a plurality of pages of data which each include one or more selectable graphical areas depicted therein, said computer program product comprising:
   a computer readable medium; instruction means embodied within said computer readable medium for determining a particular optimum speed of movement of a graphical pointer within a selected page of data by determining a display size and content of said selected page of data;
   instruction means embodied within said computer readable medium for detecting a display of said selected page of data within said computer system; and
   instruction means embodied within said computer readable medium for automatically setting said particular optimum speed of movement of said graphical pointer in response to detecting said display of said selected page of data.

8. A method for selectively controlling the speed of movement of a graphical pointer in a computer system capable of displaying a plurality of pages of data which each include one or more graphically selectable areas depicted therein, said method comprising the steps of:
   determining a particular optimum speed of movement of a graphical pointer within a selected page of data by analyzing movement of said graphical pointer during a previous display of said selected page of data;

detecting a display of said selected page of data within said computer system; and automatically setting said particular optimum speed of movement of said graphical pointer in response to detecting said display of said selected page of data.

9. A method for selectively controlling the speed of movement of a graphical pointer in a computer system capable of displaying a plurality of pages of data which each include one or more graphically selectable areas depicted therein, said method comprising the steps of:

determining a particular optimum speed of movement of a graphical pointer within a selected page of data by filtering out minor movements of said graphical pointer within said selected page of data;

detecting a display of said selected page of data within said computer system; and automatically setting said particular optimum speed of movement of said graphical pointer in response to detecting said display of said selected page of data.

10. A method for selectively controlling the speed of movement of a graphical pointer in a computer system capable of displaying a plurality of pages of data which each include one or more graphically selectable areas depicted therein, said method comprising the steps of:

determining a particular optimum speed of movement of a graphical pointer within a selected page of data by selecting a particular optimum speed of movement of a graphical pointer and a similar page of data having a similar number and distribution of graphically selectable areas as said selected page of data;

detecting a display of said selected page of data within said computer system; and automatically setting said particular optimum speed of movement of said graphical pointer in response to detecting said display of said selected page of data.

11. A system for selectively controlling the speed of movement of a graphical pointer in a computer system capable of displaying a plurality of pages of data which each include one or more graphically selectable areas depicted therein, said system comprising:

a controllable graphical pointer driver for determining a particular optimum speed of movement of a graphical pointer within a selected page of data by analyzing movement of a graphical pointer within said selected page of data during a previous display of said selected page of data;

display control means for detecting a display of said selected page of data within said computer system; and control means coupled to said controllable graphical pointer driver for automatically setting said particular optimum speed of movement of said graphical pointer in response to detecting said display of said selected page of data.

12. A system for selectively controlling the speed of movement of a graphical pointer in a computer system capable of displaying a plurality of pages of data which each include one or more graphically selectable areas depicted therein, said system comprising:

a controllable graphical pointer driver for determining a particular optimum speed of movement of a graphical pointer within a selected page of data including a filter for automatically filtering out minor movements of said graphical pointer within said selected page of data;

display control means for detecting a display of said selected page of data within said computer system; and control means coupled to said controllable graphical pointer driver for automatically setting said particular optimum speed of movement of said graphical pointer in response to detecting said display of said selected page of data.

13. A system for selectively controlling the speed of movement of a graphical pointer in a computer system capable of displaying a plurality of pages of data which each include one or more graphically selectable areas depicted therein, said system comprising:

a controllable graphical pointer for determining a particular optimum speed of movement of a graphical pointer within a selected page of data by selecting a particular optimum speed of movement of a graphical pointer determined for a similar page of data having a similar number and distribution of graphically selectable areas as said selected page of data;

display control means for detecting a display of said selected page of data within said computer system; and control means coupled to said controllable graphical pointer driver for automatically setting said particular optimum speed of movement of said graphical pointer in response to detecting said display of said selected page of data.

* * * * *